April 10, 1956 D. M. KING 2,741,190
INDEXING SYSTEM FOR STOPPING CONVEYORS
Filed June 10, 1952

INVENTOR
DONALD MAYER KING
BY:
Haseltine, Lake & Co.
AGENTS

United States Patent Office 2,741,190
Patented Apr. 10, 1956

2,741,190

INDEXING SYSTEM FOR STOPPING CONVEYORS

Donald Mayer King, Hitchin, England

Application June 10, 1952, Serial No. 292,628

Claims priority, application Great Britain June 13, 1951

8 Claims. (Cl. 104—93)

This invention relates to conveyor systems and more particularly to such systems of the kind wherein loads or load carriers are supported on the upper surface of and are transported by one or more endless driven chains or the like.

It is the chief object of the invention to evolve indexing means for application to a conveyor system of the kind referred to so that a preselected number of loads or load carriers may be held temporarily in a storage or marshalling section of the conveyor and may be released successively from such section, as and when required.

According to the invention indexing means are provided adapted on stoppage of a load or load carrier at a preselected station on the conveyor path to effect stoppage of one or more succeeding loads or load carriers at one or more preselected stations preceding that at which the first load or load carrier is stopped, the arrangement being such that upon release of said first load or load carrier, such succeeding loads or load carriers as have been arrested will be released automatically from their holding stations and moved forwardly by one station.

In accordance with a further aspect of the invention an indexing mechanism for a conveyor system of the kind set forth comprises a stop device located at a final station on the conveyor path, one or more subsidiary stop devices disposed at one or more stations preceding said final station and means adapted on stoppage of a load or load carrier at the final station to effect successive operation of the subsidiary stop devices, thereby successively to stop following loads or load carriers, the arrangement being such that upon release of the load or load carrier from the final station, such subsidiary stop devices as have been operated will be successively released to allow forward movement of the loads or load carriers held thereby until such time as the stop device at the final station is again effective to arrest a load or load carrier whereupon said subsidiary stop devices will again be successively rendered effective.

In order that the said invention may be clearly understood and readily carried into effect the same will be hereinafter more fully described with reference to the accompanying diagrammatic drawings, in which.

Figure 1:
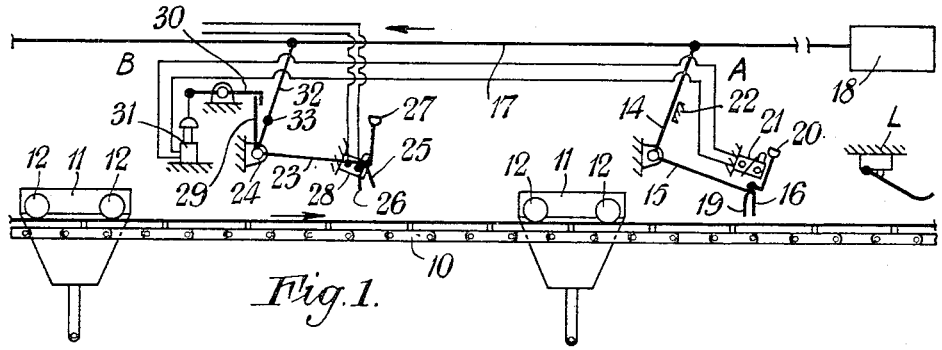
Figure 1 is a side elevational view showing a section of a conveyor incorporating an electrically controlled indexing mechanism.
Figure 3:
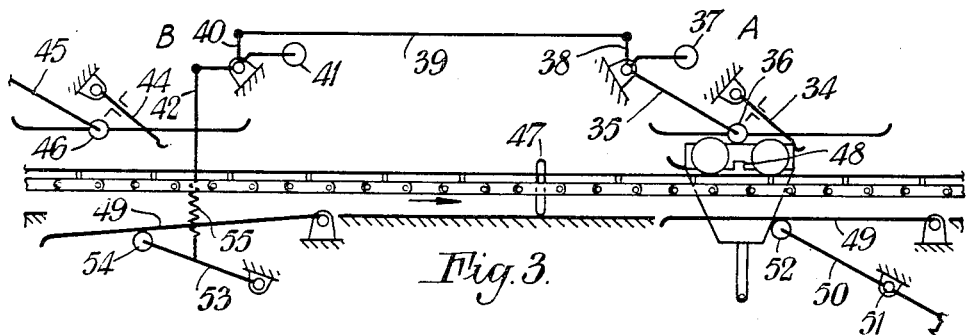
Figure 3 is a side elevational view showing a section of a conveyor incorporating mechanically operated indexing mechanism.
Figure 2:
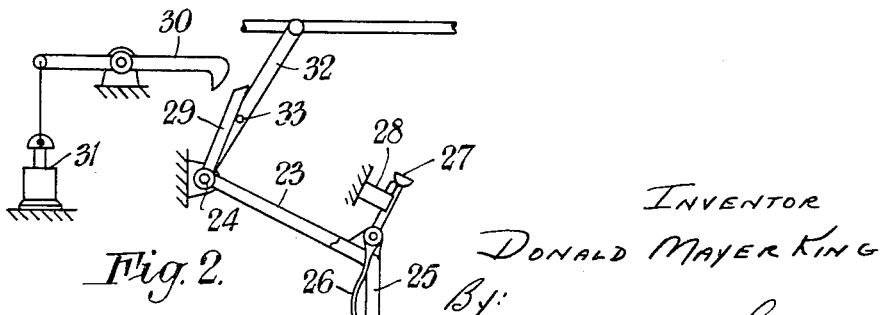
Figure 2 is a side elevational view illustrating in greater detail and on a larger scale one of the stop mechanisms shown in Figure 1.

In the embodiment illustrated in Figures 1–3 of the drawings, the conveyor to which the indexing mechanism is applied is of the kind described in the specification of my co-pending patent application Ser. No. 292,627 filed June 10, 1951, and comprises a single endless driving chain 10 which is adapted to impart motion to a plurality of load carriers 11, hereinafter termed "trolleys," the latter having a plurality of wheels or rollers 12 which are adapted to engage the chains or platforms or the like associated therewith and the arrangement being such that while the trolleys will normally be carried along by the chain they are nevertheless, due to the provision of the wheels or rollers 12, capable of being stopped or moved relatively to said chain when required, without interrupting or varying the drive to the latter. If desired, instead of providing wheels or rollers on the trolleys 11 as indicated above, the chain 10 itself may incorporate a plurality of rollers which project beyond the upper surface thereof and serve actually to support the trolleys, the latter in this case being equipped with fixed shoes or other supporting surfaces adapted to bear on the rollers carried by the chain.

As indicated above it is the object of the invention to provide means so that a preselected number of trollies may be held temporarily in a storage or marshalling section of a conveyor and may be released successively from such section, as and when required. With that object in view a stop mechanism is disposed at a predetermined point in that section of the conveyor intended for storage or marshalling purposes. For the purposes of the present description the point at which the first stop mechanism is installed will be termed the "final station." At a plurality of points preceding the final station reckoned on the terms of the direction of travel of the conveyor, subsidiary holding stations are established, further stop mechanisms being installed at such stations and the arrangement being such that with a trolley held at the final station, the next following trolley will be arrested and held at the first preceding station while the next following trolley (i. e. the third trolley) will be held at a second preceding station and so on. Upon release of the trolley from the final station, the stop mechanisms at the subsidiary stations will be operated to allow the trolleys to be moved up successively by one station, i. e. that the trolley at the first preceding station will be moved to the final station while the trolley at the second preceding station will be moved up to the first and so on. Any number of subsidiary holding stations may be provided and the arrangement may in certain cases be such that successive stations, proceeding rearwardly from the final station, will be disposed at slightly increasing distances apart.

In the embodiment shown in Figure 1 two stations are indicated A being the final station and B the first preceding station. The stop mechanism installed at the final station A comprises a double armed lever 14 which is mounted for pivotal or angular movement about a pivot 15. The lowermost arm of the lever 14 is provided with a depending portion 16 adapted actually to engage the load carrying trolleys while the uppermost arm is connected at its upper end to a release rod 17 which is adapted to be actuated by means of a thruster mechanism indicated at 18. Pivotally mounted at or adjacent the outer end of the lowermost arm of the lever 14 is a leaf or tongue 19 with which is associated a cam or the like 20, the latter being adapted to co-operate with the movable element or plunger of a switch 21. Preferably a stop 22 is provided to co-operate with the double armed lever 14 in order to limit the pivotal or angular movement of the latter in one direction and thereby to determine the normal or operative position of such lever. It will be appreciated that in the case of the stop mechanism at the final station, the lever 14 will normally assume an operative position as shown wherein the portion 16 will lie on the path of trolleys passing along the conveyor.

At the first preceding station B the stop mechanism which will normally assume an inoperative position as shown, comprises, as will be clearly seen from Figure 2, a stop arm 23 which is mounted for pivotal movement about a pivot 24. The arm 23, as is the case with the lever 14 is formed at its outer end with a depending portion 25 adapted to engage the load carrying trollies. Also provided at or adjacent the outer end of the arm 23 is a pivoted leaf or tongue 26 with which a cam 27 is associated, said cam being adapted to co-operate with the plunger or other movable element of a switch 28. Rigidly connected to or formed integrally with the arm 23 is an arm 29 with which a pivoted catch member 30 is adapted to co-operate, said member 30 being coupled to a solenoid 31 which is disposed in a circuit controlled by the switch 21 at the final station. The arrangement is such that while the catch member 30 will normally engage with the arm 29 thereby to retain the arm 23 in its inoperative position as shown in Figure 1, it is adapted on energisation of the solenoid 31, following closure of the switch 21 at station A, to be disengaged from said arm 29 thereby to allow the arm 23 to assume an operative position as indicated in Figure 2. Also mounted on the pivot 24 is an arm 32 which is coupled to the release rod 17, said arm 32 carrying a peg or the like 33 which is adapted to form a stop for the arm 29. If desired, the arrangement may be such that the position of the peg or the like 33 is adjustable. Each subsidiary holding station preceding station B will be provided with a mechanism similar to that installed at B, each mechanism being actuated on closure of the switch (i. e. the switch 28) at the next forward station.

The mechanism above described is adapted to operate as follows:

The first trolley to enter the storage or marshalling section of the conveyor will pass all of the subsidiary or preceding holding stations (the levers corresponding to 23 will be in their inoperative positions and on approaching the final station it will contact the leaf or tongue 19 being actually arrested by the depending portion 16 of the lever 14. Movement of the leaf or tongue 19 will cause the cam or the like 20 to close the switch 21 for a period depending upon the length of said cam whereafter the latter will be moved clear of the movable element of said switch. When the switch 21 is closed the solenoid 31 at station B will be operated thereby to actuate the catch member 29 and to allow the arm 23 to move into its operative position wherein the portion 25 will contact and stop the next following trolley. The next following trolley on arrival at station B will contact the leaf or tongue 26 and thus effect operation of the stop mechanism at the next preceding station and so on. It is to be noted that during descent of the stop arm 23 at station B the cam 27 will not be effective to operate the switch 28, said cam only being in operative relationship with the movable element of said switch when said arm 23 is in its operative position.

In order to release the trolley from the final station the thruster mechanism 18 is actuated in any convenient manner, for example, either by an operator closing a switch or by a trolley in another point of the system, thereby to effect longitudinal movement of the release rod 17 and movement of the stops into their inoperative positions, whereupon the trolleys held in the storage or marshalling section will commence to move forwardly. It will be appreciated that when the stop arms (i. e. the arms corresponding to the arms 23 at station B) are moved upwardly into their inoperative positions as a result of the movement of the release rod 17 the catch member 30 will in each case be effective to engage the arm 29 and thereby to retain said arms in their inoperative position. It will be recalled that the solenoids 31 are only energised for a certain period and that when resetting takes place they will be already de-energised. It is not essential that the release rod 17 should be continuous for whole system. Several separate thruster or other equivalent mechanisms may be provided or each station may have an individual thruster or the like.

Disposed forwardly of the final station is a limit switch L so that as the trolley previously held at the final station moves forwardly from such station, it will co-operate with said switch thereby to effect re-setting of the thruster mechanism 18, retraction of the release rod 17 and resetting of the lever 14 in its operative position thereby to stop the next succeeding trolley, whereafter the cycle outlined above will be repeated.

In the embodiment described above the subsidiary holding stations are preferably arranged at slightly increasing centres apart in order to ensure that the stop arms will be in their operative positions prior to the arrival of trolleys at the designated points.

In the embodiment illustrated in Figure 3 a mechanically operated indexing mechanism is indicated. In this case a spring stop 34 is disposed at the final station A, such stop being adapted to assume an operative position wherein it will contact any trolley approaching the same. Also located at the station A is a pivoted arm or lever 35 which carries a roller 36 at its lower end, said roller being normally so disposed as to lie in the path of movement of the trolleys so that said arm or lever 35 will be actuated by the latter. Associated with the arm or lever 35 is a balance weight 37 adapted normally to urge the said lever into its operative position. Mounted in fixed angular relation to the arm or lever 35 to move angularly therewith is a lever 38 which is coupled by means of a connecting rod 39 with a pivoted bell crank lever 40 disposed at the first subsidiary or holding station B. The lever 40 has a balance weight 41 associated therewith tending to move the same in a clockwise direction as shown, and coupled to said lever is a depending rod 42. Also located at the station B is a spring stop arm 44 which normally assumes a position wherein the lower end thereof will lie in the path of trolleys passing along the conveyor. Also present at the station B is a pivoted arm or lever 45 carrying a roller 46, said arm or lever corresponding to and being adapted to function in the same manner as the arm or lever 35, i. e. being adapted to effect operation of the stop mechanism at the next preceding station.

In the embodiment illustrated in Figure 3 it is intended that the conveyor chain 10 will carry spring loaded pins, dogs or the like, one of which is indicated at 47, adapted to engage a slot or recess 48 in each trolley thereby to impart a positive drive to the latter. Such an arrangement is described in the specification of my co-pending patent application Ser. No. 292,627. Instead of arranging for pins, dogs or the like, such as 47, on the chain actually to engage in recesses on the trolleys in the manner indicated it may obviously be desirable to arrange for such pins, dogs or the like merely to engage the rear of the trolleys, thereby to propel the same forwardly. In such cases it may also be necessary to provide retaining dogs or the like on the chain in order to prevent undesired forward movement of the trolleys relatively to said chain. With such arrangements it will be necessary to provide for disengagement of the pins, dogs or the like in the chain from the trolleys and passage of the same underneath the latter when said trolleys are arrested by the stop mechanisms. For this purpose pivoted ramps such as are indicated at 49 are disposed below the conveyor chain one in the region of each stop mechanism. The ramp 49 at the final station A is normally maintained in its inoperative position but it is adapted to be moved into its operative position (as shown) by means of a spring loaded arm 50 which is pivoted at 51 and carries at one end a freely rotatable roller 52 adapted to bear against the underside of the ramp. The arm 50 is coupled at its other end to an initiator device (not shown) which may be operated by means of a solenoid, thruster or other device. The ramp 49 at the preceding station B (and at each other preceding station) is normally maintained in its operative position and it is controlled by means of a pivoted arm 53 carrying a freely rotatable roller 54 adapted to bear on the underside of said ramp. The arm 53 is coupled by means of a spring 55 to the vertical rod 42.

The mechanism illustrated in Figure 3 is adapted to operate as follows:

The first trolley to enter the storage or marshalling section of the conveyor will pass all of the subsidiary or preceding holding stations but will be arrested by the stop 34 since the ramp 49 at the final station is in its lowermost or inoperative position. It will be appreciated that during the passage of the trolley to the final station, all of the ramps 49 at the preceding or subsidiary stations will be in their uppermost or operative positions. Due to the fact that the ramp 49 at the final station is inoperative the pin or dog 47 on the chain will be allowed to disengage from the trolley so that the stop 34 will be effective to arrest said trolley. If the ramp 49 at the final station were not in its inoperative position the pin or dog on the chain would continue to engage the trolley and would impart a positive drive to the latter thereby to push the same past the stop 34. As the trolley passes to the stop 34 it will contact the roller 36 on the arm or lever 35 and will impart an angular movement to the latter sufficient to cause longitudinal movement of the connecting rod 39 and anti-clockwise movement of the lever 40 which will result in downward movement of the rod 42 at the preceding station. Downward movement of said rod 42 will allow the ramp 49 at that station to move into its inoperative position thereby to allow for discontinuance of the drive to said next following trolley. It will be appreciated that if the trolley passes the final station or is released therefrom, then the roller 36 will pass out of contact with the top of said trolley with the result that the arm or lever 35 will be returned to its initial position due to the action of gravity and to the balance weight 37 thereby to reset the mechanism at the preceding station in its initial position, i. e. the ramp 49 will be restored to its uppermost or operative position. Assuming that trolleys are held one at the final station and also at one or more of the subsidiary stations, then when it is required to release a trolley for forward transmission along the conveyor it will only be necessary to operate the initiator to move the ramp 49 at the final station to its upper or operative position thereby to re-establish a driving connection between the chain and the trolley at said final station. By virtue of the spring loading of the ramp 49, the latter will be able to move downwardly slightly thereby to allow for the pin or dog on the chain to pass along the underside of the trolley until such time as it is brought into a position wherein it can engage the recess in the latter. Once a driving connection is established the trolley will be pushed past the stop 34 and as it clears the stop mechanism at the final station the mechanism at the next preceding station will be operated to allow passage therefrom of the trolley held thereat. With the release of the trolley from the station B, the trolleys at the next preceding station will be released and so on. If the ramp at the final station is operated to effect arrest of the next trolley then the cycle outlined above will recommence and succeeding trolleys will be held, one at each of the preceding stations. Instead of providing spring stops, such as are indicated at 34 and 44, it may be feasible to provide stops in the form of spring loaded levers or the like such as are described with reference to Figure 4 in the specification of my co-pending patent application Ser. No. 292,627.

Figure 4:
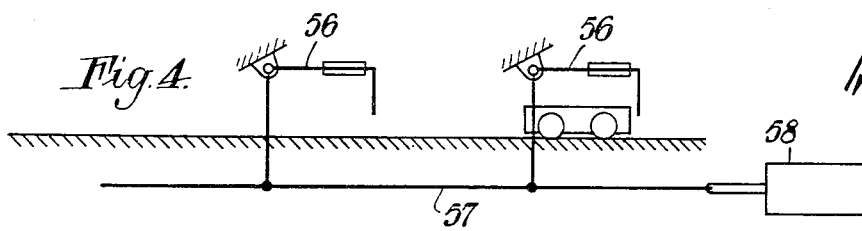
Figures 4 and 5 are side elevational views illustrating a further possible form of mechanism.
Figure 5:
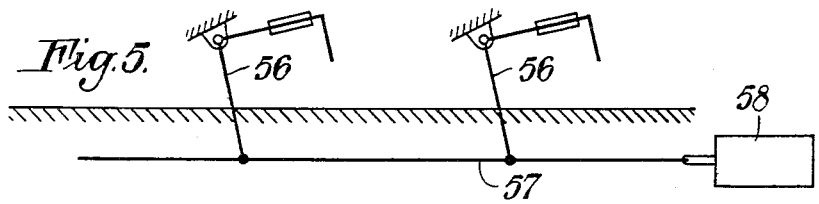

In Figures 4 and 5, another form of mechanism is indicated which may be applied to a single chain conveyor adapted to support loads or load carriers, or to a conveyor comprising two endless chains which are disposed in spaced parallel relationship, and are driven at the same speed so that loads or load carriers may be placed thereon and conveyed thereby. If desired, the chain or chains may incorporate rollers which project beyond the upper surfaces thereof and serve actually to support the loads or load carriers or alternatively the load carriers may incorporate rollers adapted to engage the chain or chains.

The mechanism illustrated in Figures 4 and 5 comprises a plurality of pivoted stop members 56 which are spaced apart along a section of the conveyor path and are pivotally connected to a common operating rod or the like 57 which is supported for longitudinal movement back and forth along a line parallel to the path of travel of the conveyor chain or chains, said rod or the like being coupled to a thruster mechanism indicated at 58. The arrangement is such that on longitudinal movement of the rod or the like 57 in one direction, the pivoted stop members 56 will be swung into an operative position as shown in Figure 4 wherein a portion of each thereof will project into the path of the load carriers supported by the chain or chains, thereby to provide a plurality of spaced stops, each of which will serve to arrest a load carrier. On longitudinal movement of the rod or the like 57 in the opposite direction, said stop members 56 will be swung downwardly out of the path of the load carriers as shown in Figure 5, thereby to release the same and to allow further travel thereof with the chains. The thruster mechanism 58 may be operated electrically, e. g. by means of a solenoid or pneumatically, the operation being effected either automatically by a load carrier on the conveyor which has previously passed out of the storage or marshalling section or by an operator. Instead of a thruster mechanism, the appropriate motion could be imparted to the stop members by means of a manually operated lever or the like. Furthermore, as indicated, it may be feasible to associate weights with the stop members or alternatively to associate one or more springs or other similar devices with the operating rod 57 or other appropriate part of the mechanism, so that the stop members would tend to move automatically into either of their operative positions.

The mechanism illustrated in Figures 4 and 5 would be designed to operate in somewhat the following manner:

A set of stop members 56 will be provided at an appropriate section of the conveyor selected as a storage or marshalling section and when said members are in their operative positions a predetermined number of load carriers will be held in such section. When it is required to feed a load carrier from the section the mechanism is operated to move the stop members 56 into their inoperative positions whereupon the first carrier will proceed along the conveyor. As the first carrier clears the marshalling section, the mechanism is operated to reset the stop members 56 so that the succeeding carriers are arrested, such succeeding carriers having, however, moved up one stop due to the movement of the conveyor chain or chains. As indicated above, the mechanism may be operated to release the stops either manually or automatically by a carrier which has previously passed out of the marshalling section and is at a point further along the conveyor path. Similarly the mechanism may be reset after a release operation by the carrier passing out of the marshalling section or it may be reset as a result of a manual operation.

The stop members 56 may be mounted singly or in pairs, each or each pair being spaced relatively to the preceding member or members by any desired amount which will be determined by the dimensions of the load carriers and the spacing required between them when arrested.

With any of the arrangements indicated in the foregoing, it may be desirable to provide a back stop at each storage or holding station, such stop being effective to engage for example, the rear of the load carrying trolley, thereby to prevent any undesired rearward movement thereof. Such back stops may each conveniently comprise a pivoted arm which will allow passage of the trolley but which will, when the latter has passed the same, fall automatically into a position wherein it will prevent rearward movement of said trolley.

I claim:
1. In a conveyor wherein load carriers are supported on at least one endless driven chain, said load carriers being normally conveyed along by the endless driven chain and wherein are provided means for stopping said load carriers at any time without interruption of the drive to the endless driven chain: an indexing mechanism comprising a pivoted stop member located at a selected final station along the conveyor path and normally assuming a position such that a portion thereof projects into the path of any load carrier moving along the conveyor, a movable element coupled to said stop member to be actuated by any carrier stopped by the stop member, electrical switch means closable on actuation of said movable element, a retaining device disposed at a holding station located at a point in the conveyor path preceding said final station, said retaining device being operable on closure of said switch means to move into an inoperative position, a second pivoted stop member located at said holding station and normally held by said retaining device in an inoperative position but being operative, on movement of said retaining device into its inoperative position, to move into a position wherein a portion thereof projects into the path of any following load carrier thereby to stop said load carrier, and means to move said first and second stop members into their inoperative positions to release the carriers held thereby, said first stop member returning automatically to its operative position after operation of said last mentioned means while the second stop member is held by the retaining device in its inoperative position until said retaining device is again actuated.

2. An indexing mechanism as claimed in claim 1, wherein similar means are provided for each of a plurality of auxiliary holding stations disposed at spaced points along the conveyor path preceding said holding station, the stoppage of a carrier at one of said holding and auxiliary stations resulting in the operation of the pivoted stop member at the next preceding auxiliary holding station.

3. An indexing mechanism as claimed in claim 2, wherein release means are provided which are operative to move the stop members at the first and at all of the holding stations simultaneously into their inoperative positions to release the carriers held thereby, the first stop member at the final station returning automatically to its operative position after operation of said release means, the second and other stop members being held in their operative positions by their respective retaining devices until the stop members are again operated.

4. In a conveyor system wherein load carriers are supported on at least one endless driven chain and are normally conveyed along by the endless driven chain, means to stop said load carriers at any time without interruption of the drive to said chain, an indexing mechanism comprising a pivoted stop member disposed at a selected final station along the conveyor path and normally assuming a position such that a portion thereof normally projects into the path of any load carrier moving along the conveyor, an element pivotally mounted on said stop member to be actuated by any carrier stopped by the stop member, cam means associated with said pivoted element and movable on actuation thereof, electrical switch means closable on actuation of said cam means, a retaining device disposed at a holding station located at a point on the conveyor path preceding said final station, said latter device being operable on closure of said switch means to move into an inoperative position, a second pivoted stop member located at said holding station and normally held by said retaining device in an inoperative position but operative, on movement of said retaining device into its inoperative position, to move into a position wherein a portion thereof projects into the path of a following load carrier thereby to arrest the load carrier and means to move said first and second stop members into their inoperative positions to release the carriers held thereby, said first stop member returning to its operative position in accordance with the operation of said last mentioned means, the second stop member being held in its inoperative position by the retaining device in accordance with the actuation of said device.

5. In a conveyor system wherein load carriers are supported on at least one endless driven chain and are normally conveyed along by the endless driven chain, means to stop said load carriers at any time without interruption of the drive to said chain, an indexing mechanism comprising a pivoted stop member disposed at a selected final station along the conveyor path and normally assuming a position such that a portion thereof normally projects into the path of any load carrier moving along the conveyor path, a pivoted tongue coupled to said stop member to be actuated by any carrier approaching the stop member, a cam member coupled to said pivoted tongue to be movable therewith, electrical switch means closable momentarily by said cam on actuation of said pivoted tongue, a solenoid energised on closure of said switch means, a retaining device disposed at a holding station located at a point in the conveyor path preceding the aforesaid final station, said retaining device being operative on energisation of the solenoid to move into an inoperative position, a second pivoted stop member located at said holding station and normally held by said retaining device in an inoperative position but operative, on movement of said device into its inoperative position, to move into a position wherein a portion thereof projects into the path of a following load carrier thereby to arrest the load carrier and means to move said first and second stop members into their inoperative positions to release the carriers held thereby, said first stop member returning to its operative position in accordance with the operation of said last mentioned means, the second stop member being held in its inoperative position by the retaining device in accordance with the actuation of said retaining device.

6. In a conveyor system wherein load carriers are supported on at least one endless driven chain and are normally conveyed along by endless drawn chain, means for stopping the load carriers at any time without interruption of the drive to said chain, an indexing mechanism comprising a pivoted stop member located at a selected final station along the conveyor path and normally assuming a position such that a portion thereof normally projects into the path of any load carrier moving along the conveyor, a movable element coupled to said member to be actuated by any carrier stopped by said stop member, electrical switch means closable on actuation of said movable element, a retaining device disposed at a holding station located at a point in the conveyor path preceding said final station, said retaining device being operable on closure of said switch means to move into an inoperative position, a second pivoted stop member located at said holding station and normally held by said retaining device in an inoperative position but operative, on movement of said retaining device into its inoperative position, to move into a position wherein a portion thereof projects into the path of any following load carrier thereby to stop the load carrier, and means interconnecting said first and second stop members and operative on movement in one direction to move said first and second stop members simultaneously into their inoperative positions to release the carriers held thereby, said first stop member being operative on reverse movement of said last mentioned means to return automatically to its operative position, the second stop member being held in its inoperative position by the retaining device until the retaining device is again actuated.

7. In a conveyor system wherein load carriers are supported on at least one endless driven chain and are normally conveyed along by the endless driven chain, means for stopping the load carriers at any time without interruption of the drive to said chain, an indexing mechanism comprising a pivoted stop member located at a selected final station along the conveyor path and normally assuming a position such that a portion thereof normally projects into the path of any load carrier moving along the conveyor, a movable element coupled said member to be actuated by any carrier stopped by the stop member, electrical switch means closable on actuation of said movable element, a retaining device disposed at a holding station located at a point in the conveyor path preceding said final station, said retaining device being operable on closure of said switch means to move into an inoperative position, a second pivoted stop member located at said holding station and normally held by said retaining device in an inoperative position but operative, on movement of said retaining device into its inoperative position, to move into a position wherein a portion thereof projects into the path of any following load carrier thereby to stop the load carrier, a rod interconnecting said first and second stop members and electrically operated means operative to impart a longitudinal movement to said rod in one direction to move said first and second stop members into their inoperative positions to release the carriers held thereby, said first stop member being operative on reverse movement of said rod to return automatically to its operative position, the second stop member being controllably held in its inoperative position by the retaining device.

8. In a conveyor system wherein load carriers are supported on at least one endless driven chain and are normally conveyed along by the endless driven chain, means for stopping the load carriers at any time without interruption of the drive to said chain, an indexing mechanism comprising a pivoted stop member located at a selected final station along the conveyor path and normally assuming a position such that a portion thereof will normally project into the path of any load carrier moving along the conveyor, a movable element coupled to said member to be actuated by any carrier stopped by the stop member, electrical switch means closable on actuation of said movable element, a retaining device disposed at a holding station located at a point in the conveyor path preceding said final station, said retaining device being operable on closure of said switch means to move into an inoperative position, a second pivoted stop member located at said holding station and normally held by said retaining device in an inoperative position but operative, on movement of said retaining device into its inoperative position, to move into a position wherein a portion thereof projects into the path of any following load carrier thereby to stop the load carrier, a rod interconnecting said first and second stop members, electrically operated means operative on actuation to impart a longitudinal movement to said rod in one direction thereby to move said first and second stop members into their inoperative position to release the carriers held thereby and a switch device actuated by the carrier passing from the final station, and switch device being operative on actuation to effect a reverse movement of said rod thereby to reset the first stop member in its operative position the second stop member being controllably held in its inoperative position by the retaining device.

References Cited in the file of this patent

UNITED STATES PATENTS

| | | |
|---|---|---|
| 1,187,825 | Ferguson | June 20, 1916 |
| 2,234,620 | Botley | Mar. 11, 1941 |
| 2,572,011 | Cohen et al. | Oct. 23, 1951 |
| 2,612,847 | Burrows | Oct. 7, 1952 |
| 2,619,370 | Leger | Nov. 25, 1952 |
| 2,619,916 | Rainier | Dec. 2, 1952 |
| 2,635,555 | Hansson | Apr. 21, 1953 |